(12) United States Patent
Blankenship et al.

(10) Patent No.: US 6,417,489 B1
(45) Date of Patent: *Jul. 9, 2002

(54) WELDING WIRE AND METHOD OF MAKING SAME

(75) Inventors: George D. Blankenship, Chardon; Edward A. Enyedy, Eastlake, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/687,067

(22) Filed: Oct. 16, 2000

Related U.S. Application Data

(63) Continuation of application No. 09/455,338, filed on Dec. 6, 1999, which is a continuation of application No. 09/024,392, filed on Feb. 17, 1998, now abandoned.

(51) Int. Cl.[7] .............................................. B23K 35/02
(52) U.S. Cl. ...................... 219/145.31; 219/145.1; 219/76.14; 219/145.23; 219/136
(58) Field of Search ..................... 219/145.31, 145.1, 219/136, 76.14, 145.23, 121.11, 137 R, 137.2, 137 WM, 146.1, 146.3

(56) References Cited

U.S. PATENT DOCUMENTS

| | | | |
|---|---|---|---|
| 1,354,476 A | | 10/1920 | Fay |
| 1,354,664 A | * | 10/1920 | Knoll et al. |
| 1,835,899 A | | 12/1931 | Rode |
| 1,940,573 A | | 12/1933 | Austin |
| 3,620,830 A | * | 11/1971 | Kramer ....................... 117/204 |
| 3,691,340 A | * | 9/1972 | Landis et al. ................ 219/146 |
| 3,843,867 A | * | 10/1974 | Helton et al. ................ 219/137 |
| 4,072,845 A | | 2/1978 | Buckingham et al. |
| 4,864,093 A | | 9/1989 | Henderson et al. |
| 6,137,081 A | * | 10/2000 | Blankenship et al. .... 219/145.1 |
| 6,180,920 B1 | * | 1/2001 | Blankenship et al. .... 219/145.1 |

FOREIGN PATENT DOCUMENTS

| | | |
|---|---|---|
| DE | 1565430 | 2/1970 |
| GB | 1481140 | 7/1997 |
| JP | 230984 | 10/1911 |
| JP | 56-23295 | 3/1981 |
| JP | 57-7398 | 1/1982 |
| JP | 5-115994 | 5/1993 |
| SU | 408733 | 11/1973 |
| SU | 414072 | 2/1974 |
| WO | WO 92/03251 | 3/1992 |

* cited by examiner

Primary Examiner—M. Alexandra Elve
(74) Attorney, Agent, or Firm—Vickers, Daniels & Young

(57) ABSTRACT

A welding wire for use in electric arc welding and method of making same, wherein the wire has an effective outer diameter and comprises a length of solid metal formed into a series of distinct segments each having a selected volume and joined together by interconnecting bridging elements with the cross sectional area of the solid metal at said segments being greater than the cross sectional area of the solid metal at the bridging elements.

11 Claims, 4 Drawing Sheets

WELDING WIRE AND METHOD OF MAKING SAME

This application is a continuation of Ser. No. 09/455,338 filed Dec. 6, 1999 which is a continuation of Ser. No. 09/024,392 filed Feb. 17, 1998 now abandoned.

The present invention relates to the art of electric arc welding of the type where a welding wire is directed toward a workpiece and an electrical current is passed through the welding wire to the workpiece to create an arc welding process melting the end of the advancing wire and depositing the melted metal onto the workpiece and more particularly to an improved welding wire for use in this arc welding process and the method of making this improved welding wire.

BACKGROUND OF INVENTION

Electric arc welding of the type to which the present invention is directed involves the use of a welding wire normally stored upon a spool or reel, which wire is fed from the supply reel toward a workpiece through a tubular connector so that current can be directed through the connector to the advancing welding wire and through the welding wire to the workpiece. The electric current heats the advancing welding wire by $I^2R$ heating so that the end of the welding wire is melted and deposited onto the workpiece by transfer through the arc or by other electrical and mechanical phenomenon. Thus, the advancing wire conducts the welding current which melts the wire for deposition of the molten metal from the end of the wire onto the workpiece. Through the years there have been substantial improvements in the welding wire, which is normally a solid wire having a predetermined diameter and a surface lubricant so the wire can be advanced at a controlled feed speed for melting and depositing the molten metal onto the workpiece. Shielding gas can be used around the advancing welding wire. A solid wire provides superior arc welding properties; however, it is often necessary to provide the welding wire with flux and alloying metal ingredients to tailor the molten metal deposition to the desired metallurgical demands of the welding process. To accomplish these added features, it has become common practice to form the wire as a steel sheath surrounding a center core formed from fluxing ingredients and/or alloying powder. Thus, there are many cored welding wires. By using a cored wire concept, the flux can be evenly distributed along the length of the advancing welding wire. When producing the metal sheath from a somewhat standard steel, the core can include alloying powder. These metal cored electrodes employ the powdered metal in the core to tailor the deposited metal for a given welding process. There is a substantial advantage in some welding processes to use the flux cored or metal cored wire. Indeed, there are instances when a combination flux and alloy powder are used in the core of the wire. The advantages of these cored wires or electrodes for arc welding wire are somewhat offset by the fact that a solid metal wire normally produces superior arc welding. The metal is at the center of the arc and in a sheath surrounding the arc, as in a flux cored or metal cored wire. Both a solid metal wire and a metal cored wire have a substantially constant resistance per length of wire, which resistance controls the arc welding process especially in constant voltage arc welding procedures. In some arc welding processes, it is desirable to have an increased resistance per length to optimize the welding process, but such a modification affects the amount of metal being deposited. The solid metal wire and the cored metal wire satisfy the demands of the electric arc welding industry; however, they have disadvantages caused by the constraints of their physical characteristics which in some instances does not allow optimum electrical characteristics of the welding process.

THE INVENTION

The present invention is a solid metal welding wire which has distinct quantized segments that facilitate superior droplet transfer. The segments each have essentially the same volume. This use of a solid welding wire with quantized distinct segments separated by bridging elements has been found to perform well with conventional constant voltage welding sources. The current or heating is controlled by the effective resistance or resistance per length, which resistance is increased by using interconnecting smaller bridging elements between the larger segments. This type of solid wire has the advantage that it is easily made by simply processing existing solid MIG wire in a manner to produce a series of spaced indentations creating a quantized segment between adjacent indentations. Such indentations can be done at the manufacturing facility making the solid wire or in a device adjacent to the wire feeder at the welding station, which is often a robotic welding station. By using quantized spaced segments in a solid welding wire, pulsed arc welding can be coordinated so that the pulse frequency and the wire feed rate provide a quantized segment at the time of each current pulse. This coordination stabilizes the pulsed mode transfer so that a single droplet detachment is achieved with each current pulse to optimize the welding characteristics in ways well known in the welding art. The electrode is heated by current passing through the wire. The resistance of the wire has a direct effect on the heating. Thus, by using smaller areas between the quantized segments, the effective resistance or resistance per length is increased and the current is decreased when a constant voltage is applied to the welding process. This adjustment of resistance controls the heating of the advancing welding wire in a manner determined by the area and length of the bridging elements created by the indentations defining the spaced quantized segments. By using the present invention, the resistance per length of wire is higher than with a solid wire with the same outer diameter. This is an advantage at high deposition rates because the heat input into the workpiece per unit weight of wire can be reduced to extend the stable range of the constant voltage process. By reducing the cross sectional area of the metal in the bridging element between the quantized segments, the resistance per length can be modified in a tailored fashion. The shape of the indentations creating the bridging elements between the quantized segments of the solid wire electrode can be in the form of circular grooves or other configurations which reduce the area and, thus, increase the resistance of the solid wire between the quantized segments. If the bridging elements are in the form of circular grooves, the solid metal wire can be provided with fluxing, filling or alloying agents, such that the agents are carried by the grooves without affecting the outer diameter of the metal wire. Electrical contact is maintained at the outer portions of the quantized segments. By adjusting the relative length of the quantized segments and the length of the groove forming the connecting elements, the desired amount of fluxing or alloying agents can be provided per length of the advancing solid metal welding wire. Such solid wire has the advantages of standard solid wire with the added advantage of a flux cored or metal cored wire. To protect the fluxing, filling or alloying agents in the space created by the indentations forming the bridging elements, another aspect of the invention includes the use of a metal sheath around the metal electrode. This sheath can be steel or copper to enhance electrical conduction from the electrical contact in the welding equipment to the advancing solid metal welding wire. Thus, moisture contamination and physical damage to the fluxing, filling or alloying agents is inhibited. The sheath or jacket can be mechanically wrapped around the wire having spaced quantized segments by using a standard spiral wrapping technique. The sheath or jacket can be placed around the wire and drawn or rolled with the wire, using techniques similar to those employed in conventional cored wired manufacturing techniques. The sheath or jacket can also be provided by a plating technique or a plasma spray technique so long as the sheath or jacket around the quantized segments is electrically conductive. Indeed, such a sheath or jacket can be placed around the quantized segments forming the solid metal welding wire without the use of filling agents merely to enhance the electrical characteristics, or appearance, of the advancing metal wire stored on a spool for use in an automatic or semi-automatic electric arc welding process.

In accordance with the present invention, there is provided a welding wire for use in electric arc welding wherein the welding wire has an effective outer diameter and comprises a length of solid metal formed into a series of distinct segments, each having a selected volume and joined together by interconnecting bridging elements with the cross sectional area of the solid metal at these segments being greater than the cross sectional area of the solid metal at the bridging elements. In this manner, the solid metal welding wire has distinct quantized segments. By controlling the contour of the connecting bridging elements, the resistance per length of welding wire can be changed to control the welding process so that a lesser amount of current will be needed to deposit a given amount of molten metal.

In accordance with another aspect of the present invention, the bridging elements are formed by indentations, such as circular grooves, which indentations may be filled with a fluxing agent, alloying metal powder or other constituents to control the metallurgy and fluxing characteristics of the metal wire while maintaining the advantage of a solid metal arc welding wire.

In accordance with another aspect of the present invention, the quantized distinct metal segments have a maximum cross sectional area essentially defining the effective outer diameter of the solid metal welding wire while the bridging elements of the wire have a maximum cross sectional area that is substantially less than the maximum cross sectional area of the quantized segments.

In accordance with still a further aspect of the present invention, there is provided a method of producing a solid welding wire for electric arc welding, which method comprises the steps of conveying a solid metal welding wire along a given path and forming a series of indentations in the wire at equally spaced locations to define a series of distinct metal segments each having a selected volume. These quantized metal segments are joined together by bridging elements determined by the shape of the separating indentations. In practice, the indentations are circular grooves between the quantized metal segments of the solid welding wire.

In accordance with still a further aspect of the invention, this method includes the step of depositing granular flux into the indentations or depositing powder alloying metal into the indentations. In this manner, the indentations can control the even distribution of alloying agents and/or fluxing agents along the length of the solid welding wire, without requiring the use of a cored wire concept. The method also contemplates the further implementation of an aspect of the invention wherein a metal sheath of steel or other conductive material is placed around the solid metal welding wire.

By using the invention, the series of distinct quantized metal segments that are joined together by interconnecting bridging elements can have effective resistance of the solid metal welding wire accurately controlled by adjusting the relationship of the segments and bridging elements.

In accordance with another aspect of the present invention there is provided a method of controlling the resistance per length of a solid metal welding wire used for electric arc welding including the steps of providing a solid metal welding wire, forming a series of indentations in the wire at spaced locations whereby the resistance per length at the indentations is greater than the resistance per length of the wire between the indentations and controlling the size of the indentations to control the overall resistance per length of the wire. This method is further modified by including the step of controlling the spaces between the indentations to provide quantized segments of generally equal volume of metal.

The primary object of the present invention is the provision of a solid metal welding wire, which wire has a series of distinct, quantized segments joined together by bridging elements.

Another object of the present invention is the provision of a solid metal wire, as defined above, which solid metal wire can be produced from a standard MIG wire at the manufacturing facility or adjacent the wire feeding device in the welding area.

Yet another object of the present invention is the provision of a solid metal welding wire, as defined above, which wire has improved arc stability and controlled heat input. The wire can greatly facilitate pulse arc welding in a constant voltage welding process.

Still a further object of the present invention is the provision of a solid metal welding wire, as defined above, which wire can be produced to have a controlled resistance per length greater than the resistance per length of a metal wire of the same diameter.

A further object of the present invention is the provision of a solid metal welding wire, as defined above, which wire can be produced to control the resistance of the wire stick out per unit volume of wire directed to the workpiece.

Another object of the present invention is the provision of a solid metal welding wire, which wire has a greater resistance per length than a solid wire of the same diameter. This object is an advantage at very high deposition rates due to a reduced heat input to the workpiece per unit length of wire; thus extending the stable range of a constant voltage process.

Still a further object of the present invention is the provision of a solid metal welding wire, as defined above, which welding wire can have controlled resistance per unit length or controlled resistance of the stick out merely by utilizing a series of indentations defining the distinct quantized segments of the wire.

Another object of the present invention is the provision of a solid metal welding wire, as defined above, which welding wire can be coordinated with a pulse welding process so that a quantized segment of the wire is provided to the arc of the welding process simultaneously with each current pulse.

A further object of the present invention is the provision of a solid metal welding wire, as defined above, which welding wire can be provided with fluxing, filling and/or alloying agents that can be carried with the wire while maintaining the solid metal characteristics of the welding wire. In addition, the wire of the present invention can be provided with an outer metal sheath to hold the fluxing, filling or alloying agents and/or to increase the conductivity to the advancing metal welding wire during the welding process.

Another primary object of the present invention is the provision of a method of producing a welding wire for electric arc welding, which method forms a series of indentations in the wire to quantize segments of the wire so the wire can accept fluxing, filling and/or alloying agents and can have controlled resistance per length of wire.

Another object of the present invention is the provision of a method as defined above, which method can use a standard MIG welding wire and can be performed at a relatively low cost.

These and other objects and advantages will become apparent from the following description taken together with the accompanying drawings.

PREFERRED EMBODIMENT OF THE INVENTION

Figure 1:
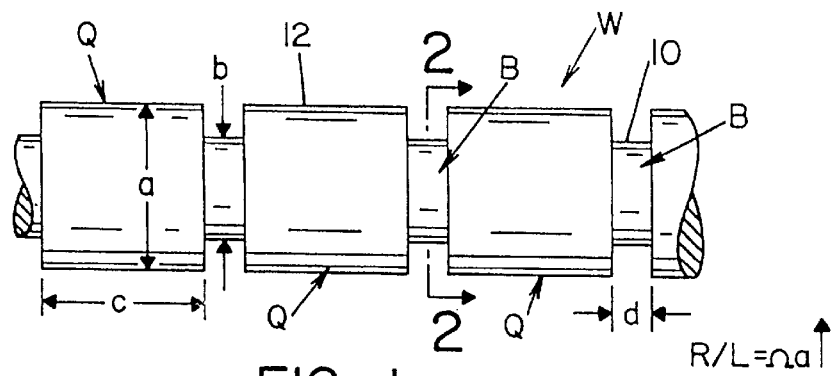
FIG. 1 is a side elevational view showing a solid metal welding wire constructed in accordance with the present invention.
Figure 2:
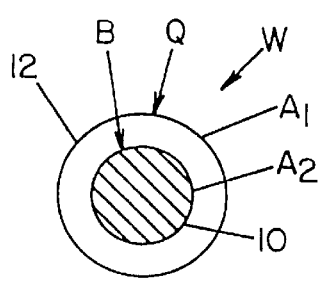
FIG. 2 is a cross sectional area taken generally along line 2—2 of FIG. 1.

Referring now to the drawings, wherein the showings are for the purpose of illustrating a preferred embodiment of the present invention and not for the purpose of limiting same, FIGS. 1 and 2 show a welding wire W constructed in accordance with the present invention. This wire has a series of distinct, quantized segments Q separated by connecting or bridging elements B. These bridging elements are formed by a series of axially spaced indentations 10 inward of cylindrical surface 12 for welding wire W. Quantized segments Q can take a variety of shapes from cylindrical to spherical and connecting elements B can have a variety of shapes determined by indentations 10 or other groove like modifications extending inwardly of surface 12. In accordance with the invention, quantized segments Q have a maximum diameter which corresponds to diameter a of wire W. The maximum diameter of the segments determines the cylindrical surface 12 of wire W. Connecting elements B have a diameter b. As illustrated in FIG. 2, a cross sectional area A, of segments Q is substantially greater than the cross sectional area $A_2$ of elements B. Thus, the resistance per length of wire W is increased by the indentations 10 forming bridging elements B. The relationship between the length c of segment Q and length d of bridging element B determines the change, or modification, in the resistance per length of wire W over the resistance per length of a standard wire having the diameter a. Thus, indentations 10 have two overall functions. The indentations separate wire W into a series of quantized segments Q each having essentially the same volume of metal. These indentations also increase the resistance through wire W so that the effective resistance per length of wire W is controlled by the contour, size and configuration of indentations 10. Thus, indentations 10 are used to control the effective resistance of wire W, whereas the quantized segments Q provide controlled droplet transfer of molten metal from wire W during the arc welding process. As can be seen, a variety of dimensions can be provided for segments Q and indentations 10 to accurately control the resistance and welding characteristics of solid wire W. However, wire W still functions as a solid welding wire. The quantizing of segments on the solid welding wire and the control of resistance through the wire is unique and forms the advantages of the invention, as previously discussed.

Figure 3:
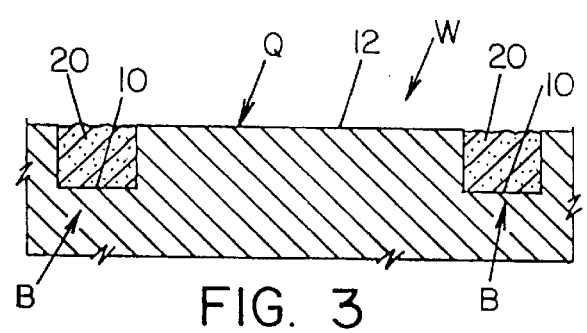
FIG. 3 is an enlarged partial cross-sectional view illustrating one quantized segment of the wire shown in FIGS. 1 and 2 with the indentations forming the bridging elements filled with a fluxing agent.
Figure 4:
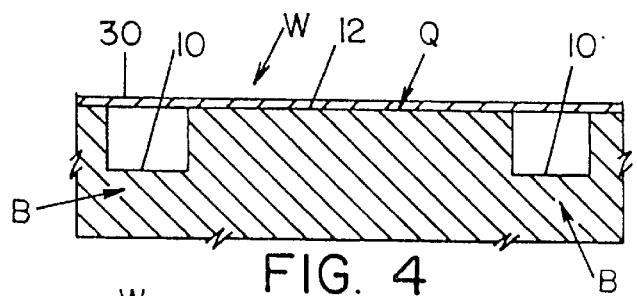
FIG. 4 is a view similar to FIG. 3 with an outer metal sheath over the metal welding wire.
Figure 4A:
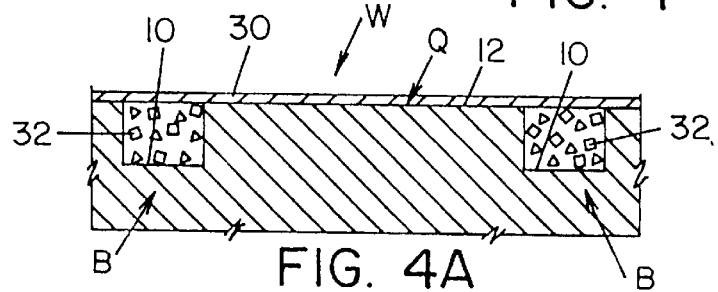
FIG. 4A is a figure similar to FIG. 4 with the indentations filled with powdered alloying metal.
Figure 4B:
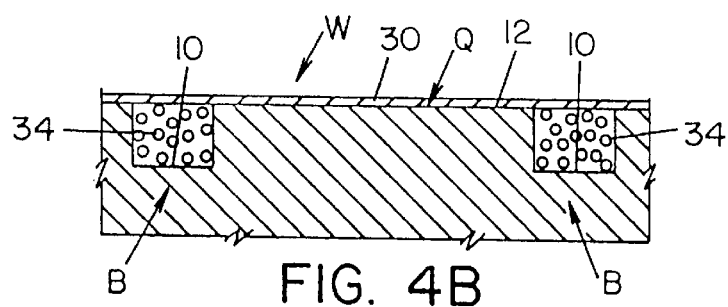
FIG. 4B is a view similar to FIG. 4 with the indentations filled with a fluxing agent.

In the preferred embodiment shown in FIGS. 1 and 2, indentations 10 are in the form of generally circular grooves having a diameter b and a length d. By using this, or any similar construction of the indentations, it is possible to load the solid welding wire W with fluxing agents, filling agents, and/or alloying agents. As shown in FIG. 3, grooves or indentations 10 are filled with a fluxing agent 20 which is normally granular in nature and formed into a paste. The paste is easily deposited in grooves 10 and remains in indentations or grooves 10. Thus, the amount of flux directed to the arc in the welding process is controlled by the size and axial spacing of grooves or indentations 10. The wire still has the characteristics of a solid metal wire, which characteristic produces arc stability, while still having the ability of carrying a flux of controlled quantities to the arc during the welding process. In the past, use of flux involved a flux cored welding wire, which wire did not have the beneficial characteristics of a solid wire. There are stick electrodes which have flux agents coated on the outside of the electrodes. Such outside coating could not be used for welding wire of the type to which the present invention is directed. In some instances it may be advisable to cover indentations 10 with an appropriate metal sheath 30, as illustrated in FIG. 4. This sheath can be a steel sheath as used in flux cored wire. In addition, it could be a copper sheath to enhance the electrical contact with wire W in the welding equipment. By using sheath 30, indentations or grooves 10 are closer so that they can retain alloying powder 32, as shown in FIG. 4A, or granular fluxing agents 34 as shown in FIG. 4B. The disclosure of FIGS. 3, 4, 4A and 4B show that a variety of structures can be used for either closing indentations 10 and/or loading indentations 10 with several additional constituents, without compromising the solid wire characteristics of wire W or the resistance controlling characteristics obtainable by use of spaced indentations 10. As shown in FIG. 3, electrical contact is maintained with surface 12 and the ratio of diameter a to diameter b and length c to length d can be adjusted to control the ratio of the quantity of materials 20, 32 and 34 with respect to the volume of wire W. Jacket or sheath 30 prevents moisture and other contaminations from entering indentation 10 and maintains agents 32 and 34 in place. In practice, when sheath 30 is employed, it is wrapped around the quantized wire as a metal foil jacket utilizing a spiral wrapping technique.

Figure 5:
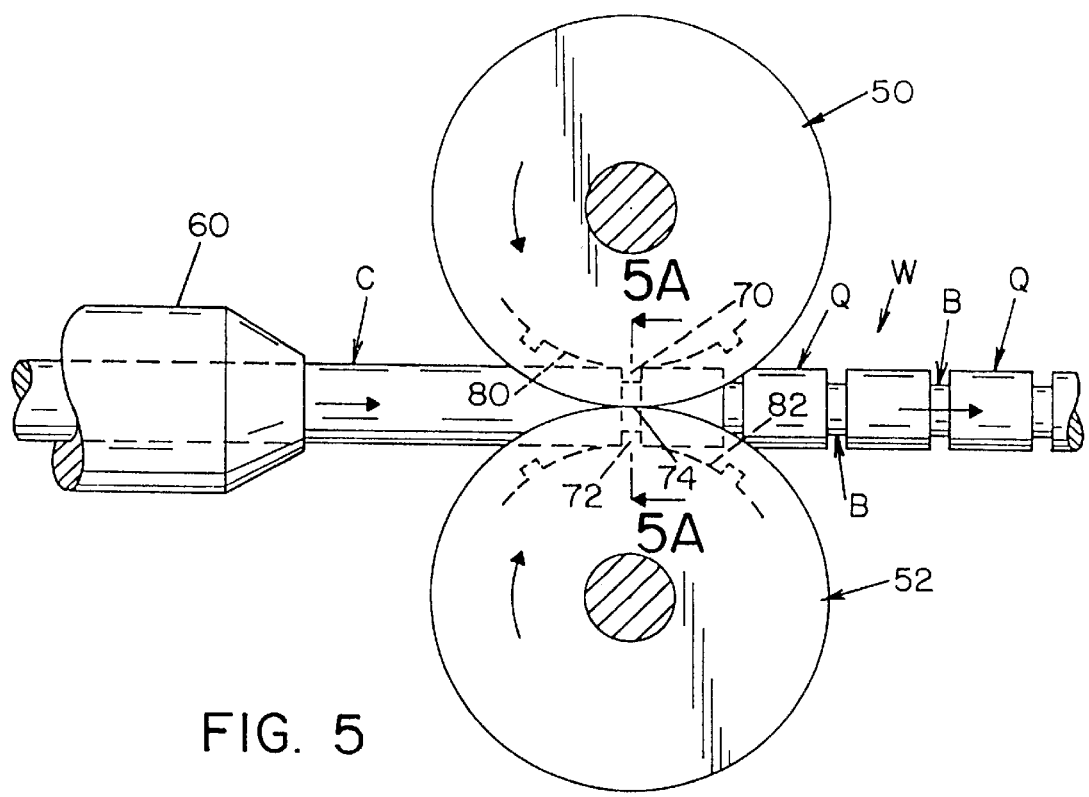
FIG. 5 is a side elevational view schematically illustrating a procedure for forming the spaced quantized segments in the solid metal welding wire by using two rotating forming wheels.
Figure 5A:
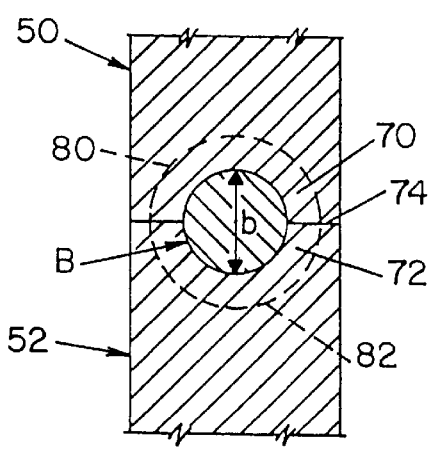
FIG. 5A is an enlarged cross sectional view taken generally along line 5A—5A of FIG. 5 at an indentation forming the bridging element.
Figure 5B:
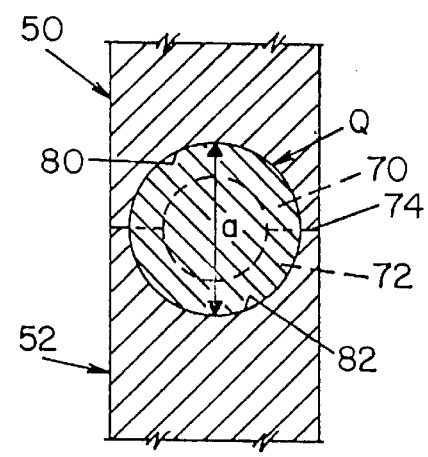
FIG. 5B is an enlarged cross sectional area taken generally along line 5A—5A at a quantized segment of the wire.
Figure 5C:
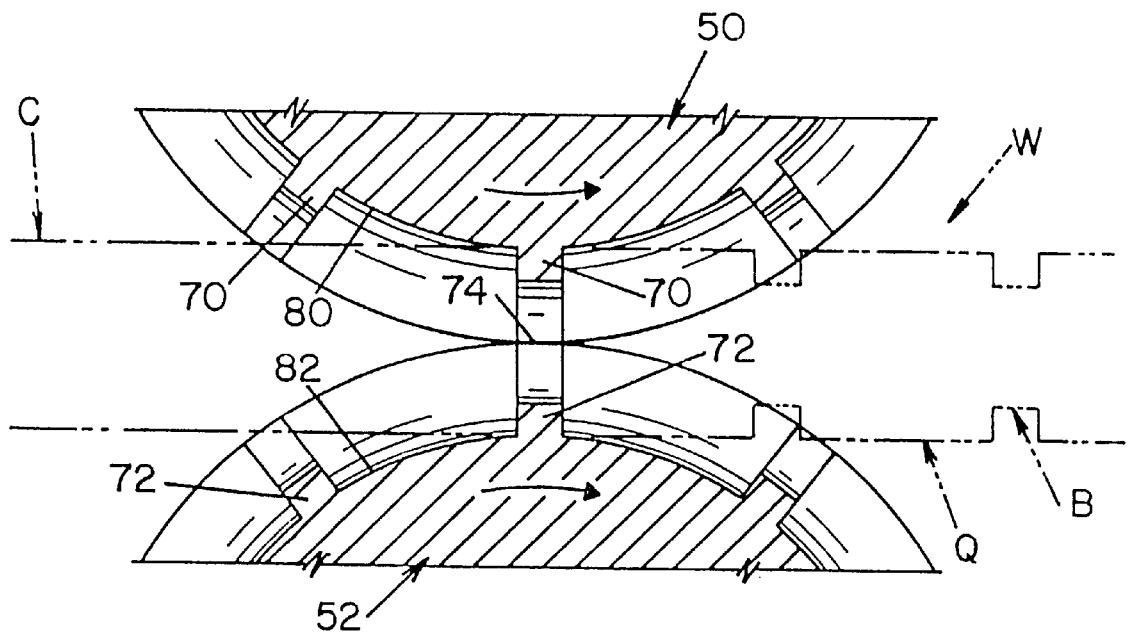
FIG. 5C is an enlarged, partial cross sectional area of the forming wheels used in forming the indentations to define spaced quantized segments in the metal welding wire.
Figure 5D:
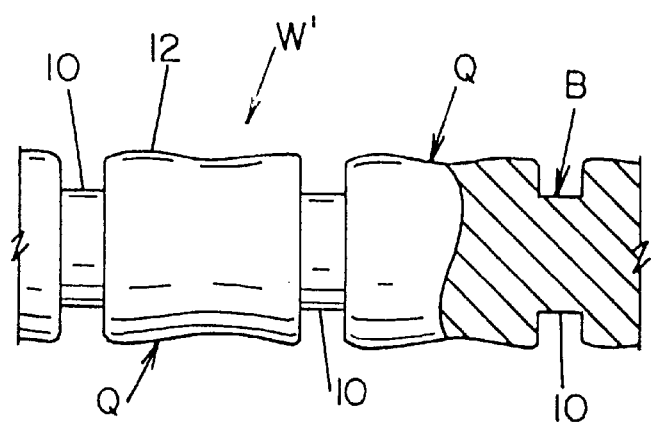
FIG. 5D is a side elevational view in partial cross section showing the wire produced by rotating forming wheels, as shown in FIG. 5; and, FIGS. 6 and 7 are a composite view showing the coordination between current pulses in a pulse arc welding process and the mechanical aspects of the welding process explaining the relationship between the pulses and the quantized segments of a welding wire constructed in accordance with the present invention.

Indentations 10 can have a variety of shapes and can be provided by a variety of procedures. Indeed, indentations can merely be formed by joining together quantized elements Q into a continuous wire W. Thus, "indentations" indicate the existence of a reduced volume inward of diameter 12, but not necessarily the procedure for accomplishing that decreased size of the volume and the increased resistance in elements B. One procedure for accomplishing the indentations 10 is schematically illustrated in FIGS. 5, 5A, 5B, 5C and 5D wherein forming wheels 50, 52 are located adjacent the outlet of wire extruder 60 that produces a standard MIG wire C. Wheels 50, 52 have a series of circumferentially spaced cogs or blades 70, 72 coming together at joint 74, as shown in FIG. 5A to upset wire C at axially spaced locations to create grooves or indentations 10. Relief areas 80, 82 are provided on wheels 50, 52, respectively for accommodating spaced, quantized segments Q to produce a wire W, as shown in FIG. 5B. As shown in FIG. 5D the outer surface 12 of the wire may have a certain unevenness created by upsetting the metal forming wire C to create the spaced, quantized segments Q. This upsetting action is minor and still produces a generally cylindrical outer surface, which surface can be used for directing electrical current into wire W' during the welding process. Forming wheels 50, 52 could be located adjacent the welding operation in front of the wire feeder for driving welding wire W to the welding area. In this manner, an operator could customize the size of segments Q and the configuration of indentations 10 with respect to the actual welding process to be performed. A different set of wheels 50, 52 could be provided for various welding operations. A standard MIG wire C could be provided to the welding locations and the quantized segments Q would be formed on the wire at that site. This is an advantage of the present invention and allows customized production of a solid welding wire having quantized segments Q separated by bridging elements B. Other arrangements could be provided for creating the indentations 10, such as laser cutters, end mills, saws, etc.

Figure 6:
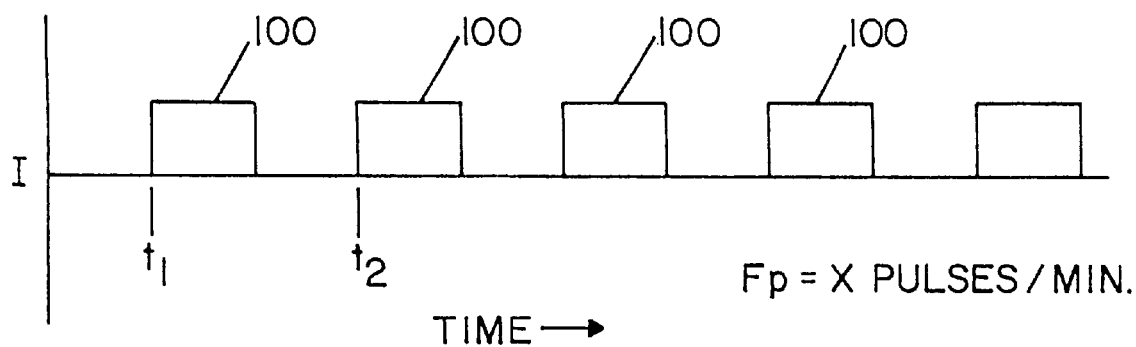
Figure 7:
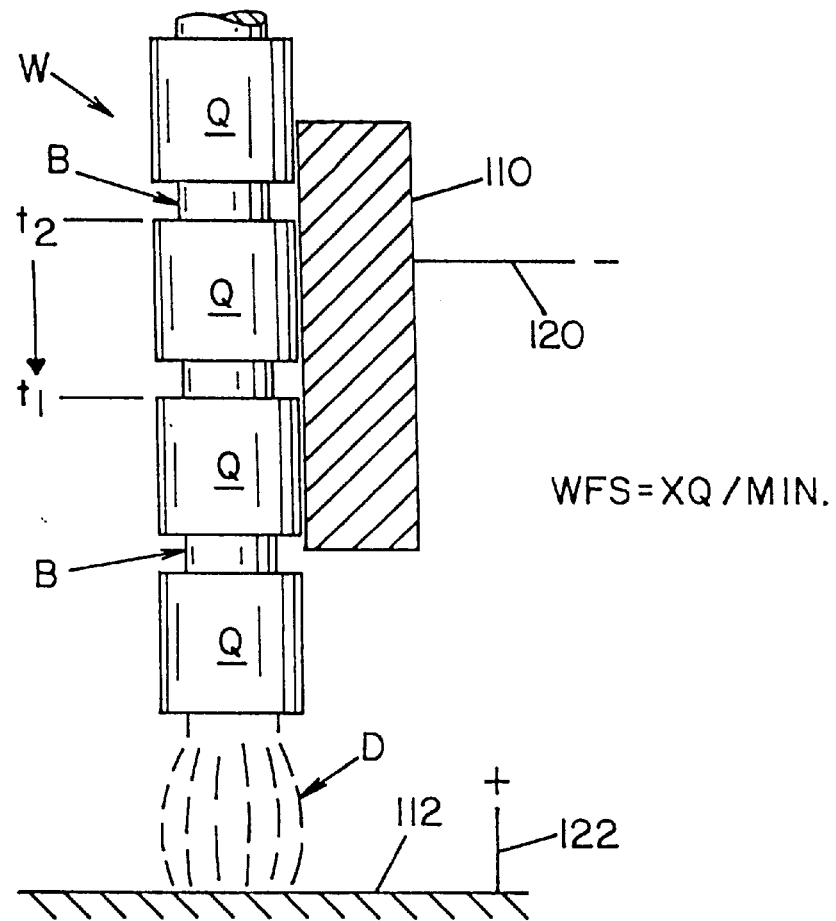

One advantage of a solid welding wire constructed in accordance with the present invention is that it can be coordinated with a pulse welding process, as schematically illustrated in FIG. 6 wherein a series of current pulses 100 from a constant voltage power supply have a time spacing $t_1$ to $t_2$. The pulse frequency of the pulses 100 is a known value, such as X pulses per minute. The lower portion of FIG. 6 illustrates schematically the welding process, wherein wire W is passed through a contact sleeve 110 toward a workpiece 112 so that wire W is melted at arc D by pulses from a power supply connected to negative lead 120 and positive lead 122. As pulses 100 are directed through arc D, wire W is moved at a wire feed speed providing a quantized segment Q at the same time as a current pulse 100. The wire feed speed is coordinated with the frequency of the current pulses so that a quantized amount of metal is provided for each pulse to melt during the pulse welding procedure. This ability to coordinate specific quantities of metal for each current pulse is an advantage of the present invention. There are other advantages as previously discussed whereby the novel concept of quantized segments joined together to form a solid metal welding wire can produce controlled resistance and superior droplet transfer.

Having thus described the invention, the following is claimed:

1. A welding wire for use in electric arc welding comprising a length of a solid metal core having an outer perimeter, a plurality of grooves in a surface of said metal core, and an electrically conducting metal sheath, said plurality of grooves defining grooved core sections and non-grooved core sections positioned between two grooved core sections, a plurality of said grooves being spaced apart from one another at a substantially equal distances from one another along a longitudinal length of said solid metal core, a plurality of said grooves extending completely about said outer perimeter of said metal core, a plurality of said non-grooved core sections having substantially a same volume, a plurality of said grooved core sections having substantially a same volume, said metal sheath at least partially positioned about a plurality of said grooved and non-grooved core sections, said metal sheath spaced from at least a portion of a surface of a plurality of said grooved core sections, said metal sheath at least partially contacting a plurality of said non-grooved core sections.

2. The welding wire as defined in claim 1, wherein a cross-section of a plurality of said grooves is generally rectangular.

3. The welding wire as defined in claim 1, wherein a cross-section of a plurality of said non-grooved core sections is generally circular.

4. The welding wire as defined in claim 2, wherein a cross-section of a plurality of said non-grooved core sections is generally circular.

5. The welding wire as defined in claim 1, wherein a plurality of said grooves contains a granular flux.

6. The welding wire as defined in claim 4, wherein a plurality of said grooves contains a granular flux.

7. The welding wire as defined in claim 1, wherein a plurality of said grooves contains an alloying metal powder.

8. The welding wire as defined in claim 5, wherein a plurality of said grooves contains an alloying metal powder.

9. The welding wire as defined in claim 6, wherein a plurality of said grooves contains an alloying metal powder.

10. The welding wire as defined in claim 1, wherein at least one of said grooved core sections having a cross-sectional resistance that is greater than a resistance along the cross-section of at least one non-grooved core section.

11. The welding wire as defined in claim 10, wherein at least one of said grooved core sections having a cross-sectional resistance that is greater than a resistance along the cross-section of at least one non-grooved core section.

* * * * *